(12) United States Patent
Salehpour et al.

(10) Patent No.: US 11,321,481 B1
(45) Date of Patent: May 3, 2022

(54) METHOD FOR DETERMINING TO GRANT OR DENY A PERMISSION REQUEST BASED ON EMPIRICAL DATA AGGREGATION

(71) Applicant: Symantec Corporation, Mountain View, CA (US)

(72) Inventors: Jonathon Salehpour, Upland, CA (US); Somard Kruayatidee, Culver City, CA (US); Kyle Dahlin, Irvine, CA (US)

(73) Assignee: Norton LifeLock, Inc., Tempe, AZ (US)

( * ) Notice: Subject to any disclaimer, the term of this patent is extended or adjusted under 35 U.S.C. 154(b) by 341 days.

(21) Appl. No.: 16/453,663

(22) Filed: Jun. 26, 2019

(51) Int. Cl.
  *H04L 29/06* (2006.01)
  *G06F 21/62* (2013.01)
  *G06F 21/56* (2013.01)
  *G06F 21/53* (2013.01)

(52) U.S. Cl.
  CPC .......... *G06F 21/6245* (2013.01); *G06F 21/53* (2013.01); *G06F 21/566* (2013.01); *G06F 2221/033* (2013.01)

(58) Field of Classification Search
  CPC .... G06F 21/6245; G06F 21/53; G06F 21/566; G06F 2221/033
  USPC .......................................................... 726/23
  See application file for complete search history.

(56) References Cited

U.S. PATENT DOCUMENTS

| | | | | |
|---|---|---|---|---|
| 7,647,622 B1* | 1/2010 | Sobel | .................. | H04L 63/1425 726/1 |
| 7,761,912 B2* | 7/2010 | Yee | ..................... | H04L 63/0263 726/11 |
| 8,312,539 B1* | 11/2012 | Nachenberg | .......... | G06F 21/554 726/22 |
| 8,364,776 B1* | 1/2013 | Conrad | .................... | G06F 21/56 709/216 |
| 9,258,318 B2* | 2/2016 | Savant | ....................... | G06F 8/61 |
| 9,503,470 B2* | 11/2016 | Gertner | ............... | H04L 63/1416 |
| 9,594,903 B1* | 3/2017 | L | ........................... | G06F 21/577 |
| 10,262,137 B1* | 4/2019 | Hart | ....................... | G06F 21/554 |
| 10,318,351 B2* | 6/2019 | Auvenshine | .......... | G06F 9/5005 |
| 2010/0077445 A1* | 3/2010 | Schneider | ............... | G06F 21/52 726/1 |
| 2011/0047620 A1* | 2/2011 | Mahaffey | ............ | H04L 63/1441 726/23 |
| 2013/0097660 A1* | 4/2013 | Das | ........................ | H04W 12/08 726/1 |
| 2013/0145463 A1* | 6/2013 | Ghosh | ..................... | G06F 21/56 726/22 |

(Continued)

OTHER PUBLICATIONS

Rashidi, Bahman et al., "RecDroid: A Resource Access Permission Control Portal and Recommendation Service for Smartphone Users", SPME Sep. 11, 2014.

*Primary Examiner* — Shin-Hon (Eric) Chen

(74) *Attorney, Agent, or Firm* — Brill Law Office; Jeffrey Brill

(57) ABSTRACT

Empirical data concerning user responses to permission requests by applications are collected over time. The collected empirical data is aggregated and analyzed to determine whether a requested permission pertains to core functionality and/or key feature(s) of an application. Based on the result of the data analysis, a directive is then generated for a subsequent request for the same permission, to provide advice to a user whether to approve or reject the permission request.

20 Claims, 6 Drawing Sheets

(56) References Cited

U.S. PATENT DOCUMENTS

| | | | |
|---|---|---|---|
| 2014/0082611 A1* | 3/2014 | Li | G06F 8/61 |
| | | | 717/178 |
| 2015/0040246 A1* | 2/2015 | Yuen | H04W 12/10 |
| | | | 726/30 |
| 2015/0163121 A1* | 6/2015 | Mahaffey | H04W 12/12 |
| | | | 707/687 |
| 2016/0352761 A1* | 12/2016 | McGrew | H04L 63/1408 |
| 2017/0061136 A1* | 3/2017 | Fung | G06F 21/577 |
| 2018/0316771 A1* | 11/2018 | Medhurst | H04L 63/1425 |
| 2019/0349391 A1* | 11/2019 | Elsner | G06K 9/6215 |
| 2020/0026523 A1* | 1/2020 | Young | G06F 11/3065 |
| 2020/0053090 A1* | 2/2020 | Kliger | H04L 63/10 |
| 2020/0218940 A1* | 7/2020 | Anglin | G06K 9/6268 |
| 2020/0336398 A1* | 10/2020 | Thomas | H04L 41/20 |

\* cited by examiner

METHOD FOR DETERMINING TO GRANT OR DENY A PERMISSION REQUEST BASED ON EMPIRICAL DATA AGGREGATION

TECHNICAL FIELD

This disclosure pertains generally to computer security, and more specifically to determining to grant or deny permission requests based on empirical data aggregation.

BACKGROUND

With the adoption of Android Marshmallow®, Google® is now enforcing the run-time permission model to protect the privacy of an Android user. Although this is very convenient since a user can now see all permissions that are given to an app, it is often unclear to the user whether certain permissions are needed for app functionality. Accordingly, a user might be tricked into accepting a permission that an app does not need for its core functionality. Similar permission-based issues can be present in other operating systems and environments.

It would be desirable to address this issue.

SUMMARY

A method for determining to grant or deny a permission request for an application running on an endpoint is provided. Specifically, empirical data concerning responses to permission requests is aggregated and analyzed to determine whether a specific permission pertains to a core functionality of an application and/or key feature(s) of an application. Based on the data aggregation and analysis, advice may be provided as to whether to grant or deny subsequent permission requests.

To determine whether specific permissions pertain to a core functionality of an application and/or key feature(s) of an application, empirical data including a plurality of users' responses to the requests for the specific permission is collected over time. The collected empirical data is then aggregated. The aggregated data is analyzed to determine the approval/rejection rate for the specific permission requests. Based on the approval/rejection rate, it is then determined whether a given permission pertains to the core functionality of the application and/or key feature(s) of the application.

When a subsequent request for the same permission by the same application is received, a directive may be generated based on the analysis of the aggregated empirical data, to advise a user whether to grant or reject the permission request. If the analysis of the aggregated data indicates that the permission pertains to the core functionality of the application and/or the key feature(s) of the application, a directive may be generated to advise the user to grant the permission request. However, if the analysis of the aggregated data indicates that the permission does not pertain to the core functionality of the application and/or key feature(s) of the application, the generated directive may advise the user to deny the permission request.

The generated directive may be delivered to the client device in response to the prompted permission request. The directive may be delivered in an overlaid dialog with advice/instruction displayed on the client device, to advise the user to grant or reject the permission request. In some implementations, the client may be directed to approve or deny the permission request automatically without user input.

In some implementations, when collecting the empirical data, the exact context under which the users deny or approve prompted permission requests are also collected. The exact context is then aggregated, and analyzed together with the collected permission requests and user responses, to provide a better understanding of whether a permission pertains to the core functionality of an application and/or key feature(s) of the application.

Accordingly, when a subsequent permission request is prompted, the exact context under which the subsequent permission request is prompted may be also collected, which is then taken into consideration in generating a directive, so a more accurate instruction/advice may be provided in the generated directive.

By receiving an instruction/advice in this way, users may make informed decisions, which helps address a growing problem with Android® and other ecosystems where applications are requesting unnecessary and potentially dangerous permissions from users. The disclosed functionality does not require an OS (operating system) modification or root privilege, which makes the disclosed functionality to be practical for most devices that run permission-enabled applications.

The Figures depict various implementations for purposes of illustration only. One skilled in the art will readily recognize from the following discussion that alternative implementations of the structures and methods illustrated herein may be employed without departing from the principles described herein.

DETAILED DESCRIPTION

Figure 1:
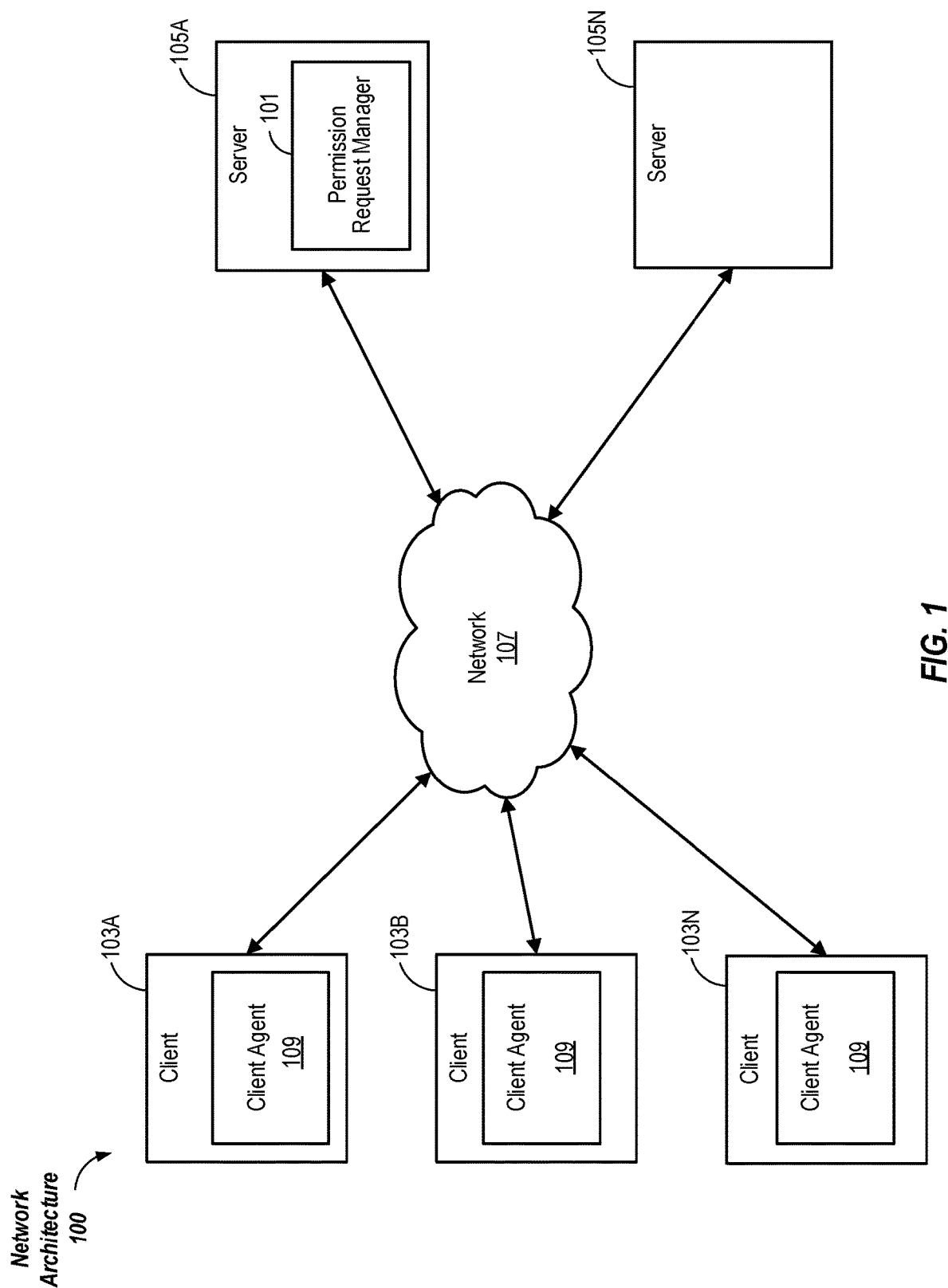
FIG. 1 is a block diagram of an exemplary network architecture in which a permission request manager can be implemented, according to some implementations.

FIG. 1 is a high-level block diagram illustrating an exemplary network architecture 100 in which a permission request manager 101 can be implemented. The illustrated network architecture 100 comprises multiple clients 103A, 103B, and 103N (together may be referred to as "client 103") as well as multiple servers 105A and 105N (together may be referred to as "server 105"). In FIG. 1, the permission request manager 101 is illustrated as residing on the server 105A, with a client agent 109 running on each client 103A-C. It is to be understood that this is an example only. In various implementations, various functionalities of permission request manager 101 can be instantiated on a client 103, a server 105, or can be distributed among multiple clients and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 as described below in conjunction with FIG. 2. Clients 103 are able to access applications and/or data on servers 105 using, for example, a web browser or other client software (not shown). Clients 103 can be in the form of mobile computing devices, comprising portable computer systems capable of connecting to a network 107 and running applications (e.g., smartphones, tablet computers, wearable computing devices, etc.). Clients may also be in the form of laptops, desktops and/or other types of computers/computing devices. Servers 105 can be in the form of, e.g., rack-mounted computing devices, located, e.g., in data centers.

Although FIG. 1 illustrates three clients 103 and two servers 105 as an example, in practice many more (or fewer) clients 103 and/or servers 105 can be deployed. In one implementation, the network 107 is in the form of the Internet. Other networks 107 or network-based environments can be used in other implementations.

Figure 2:
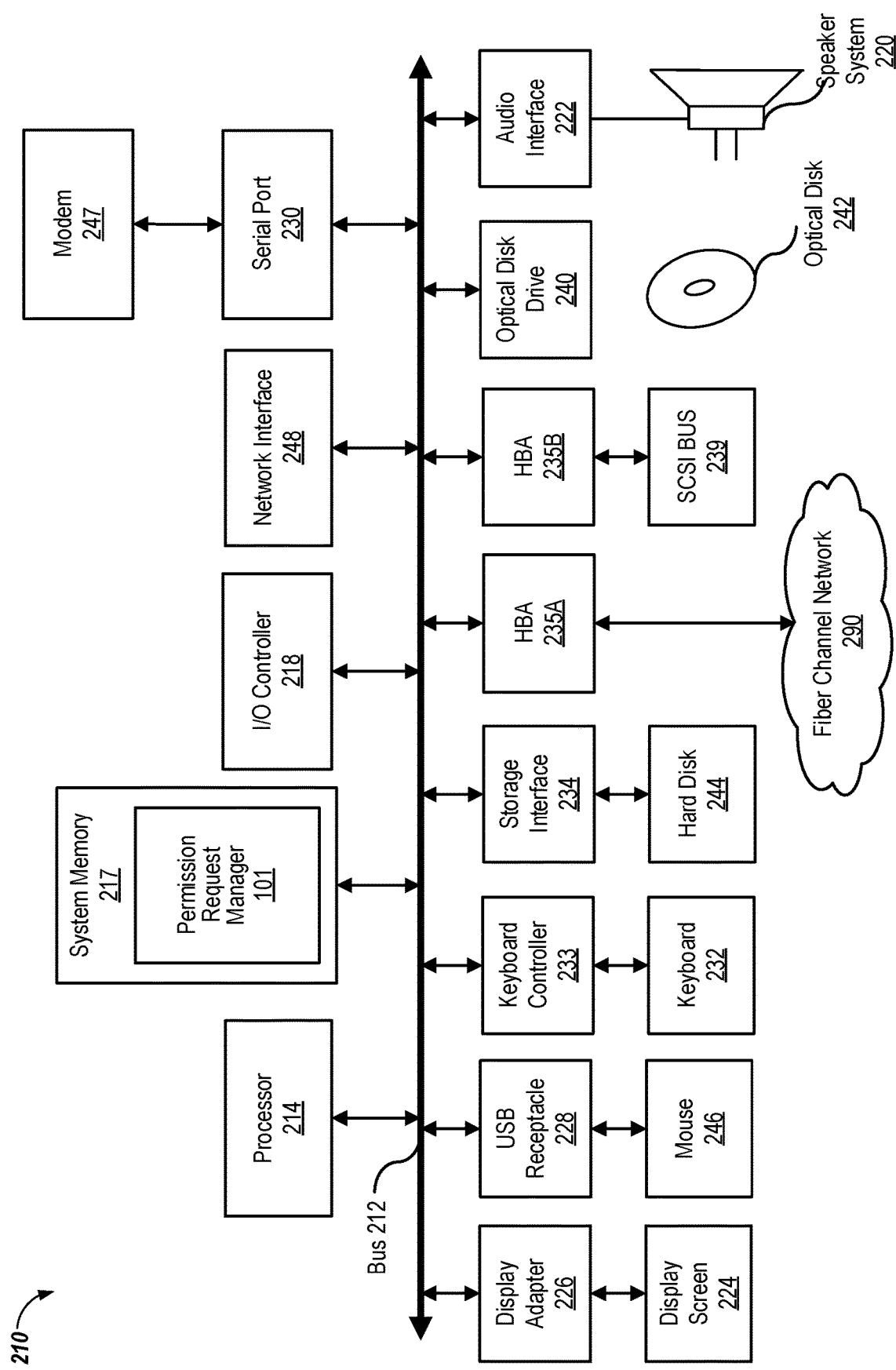
FIG. 2 is a block diagram of an exemplary computer system suitable for implementing a permission request manager, according to some implementations.

FIG. 2 is a block diagram of a computer system 210 suitable for implementing a permission request manager 101. Both clients 103 and servers 105 can be implemented in the form of such computer systems 210. As illustrated, one component of the computing device 210 is a bus 212. The bus 212 communicatively couples other components of the computing device 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of data storage media such as solid state drives (SSDs)), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or another pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computing device 210), for example via the network interface 248 or modem 247. In FIG. 2, the permission request manager 101 is illustrated as residing in system memory 217. The workings of the permission request manager 101 are explained in greater detail below in conjunction with FIGS. 3-7.

The storage interface 234 is coupled to one or more hard disks 244 (and/or other standard storage media such as SSDs). The hard disk(s) 244 may be a part of computing device 210, or may be physically separate and accessed through other interface systems.

The network interface 248 and or modem 247 can be directly or indirectly communicatively coupled to a network 107 such as the internet. Such coupling can be wired or wireless.

Figure 3:
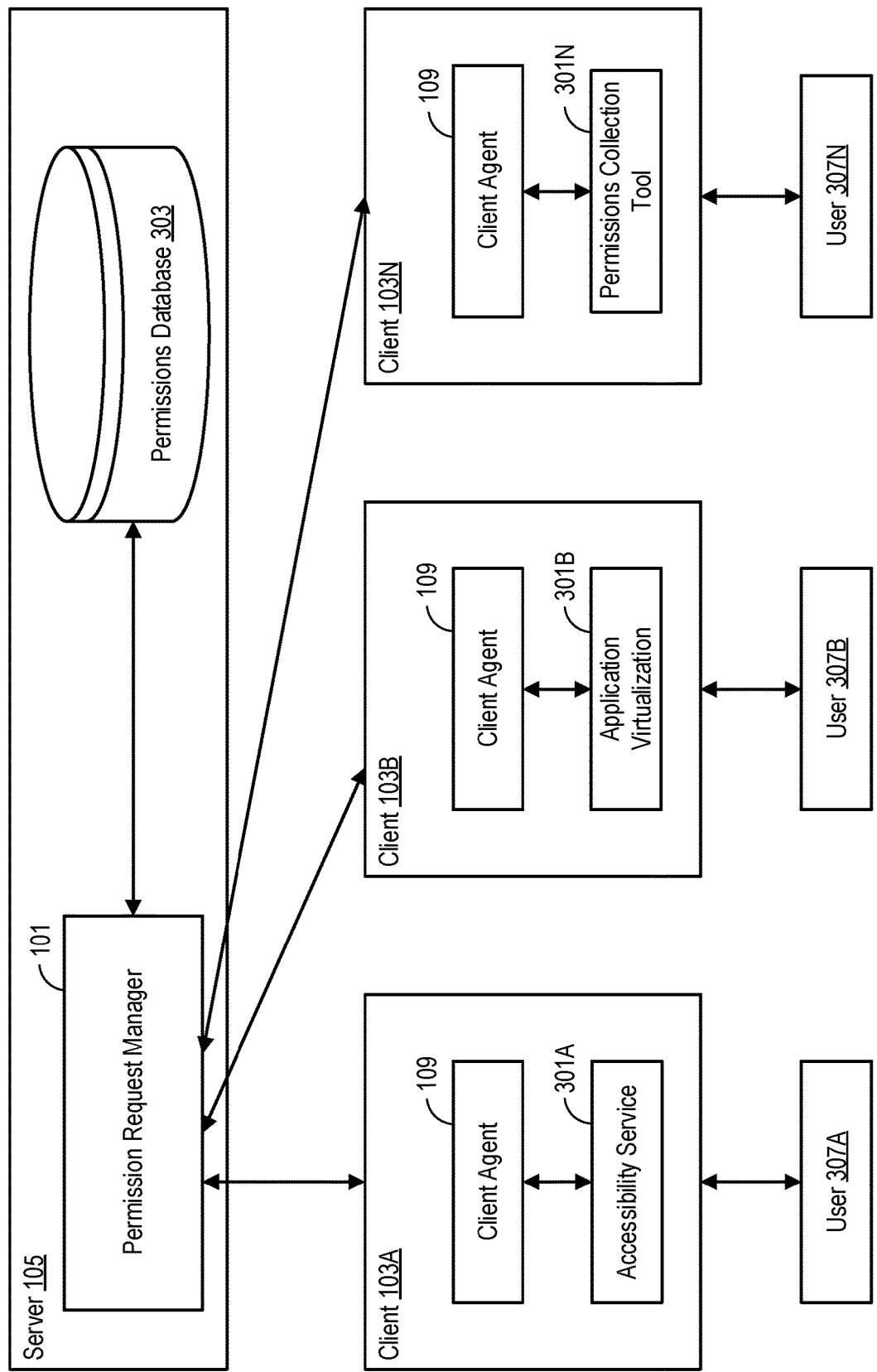
FIG. 3 is an interactive block diagram of the operation of a permission request manager, according to some implementations.
Figure 4:
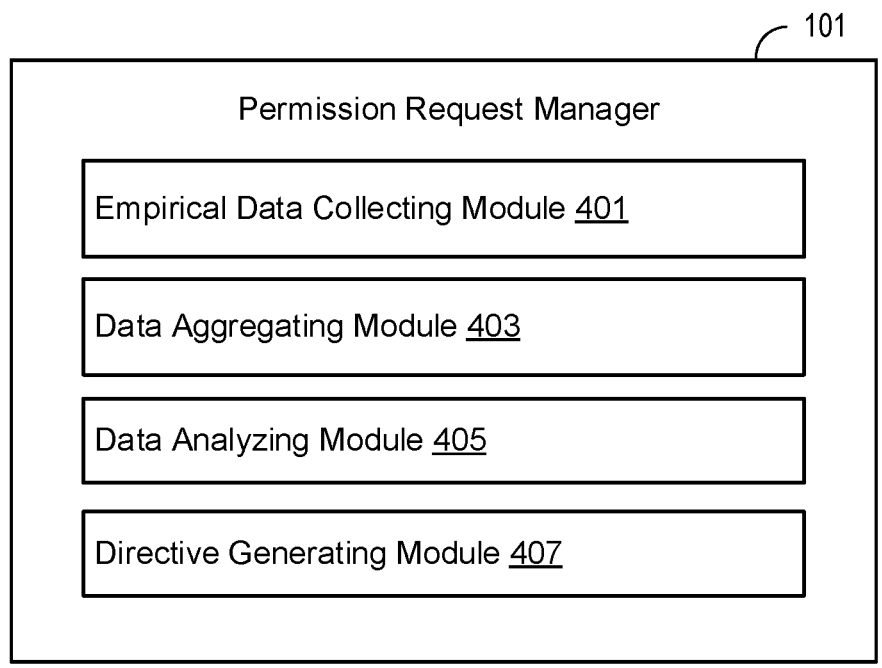
FIG. 4 is a block diagram of specific modules of a server-side permission request manager, according to some implementations.
Figure 5:
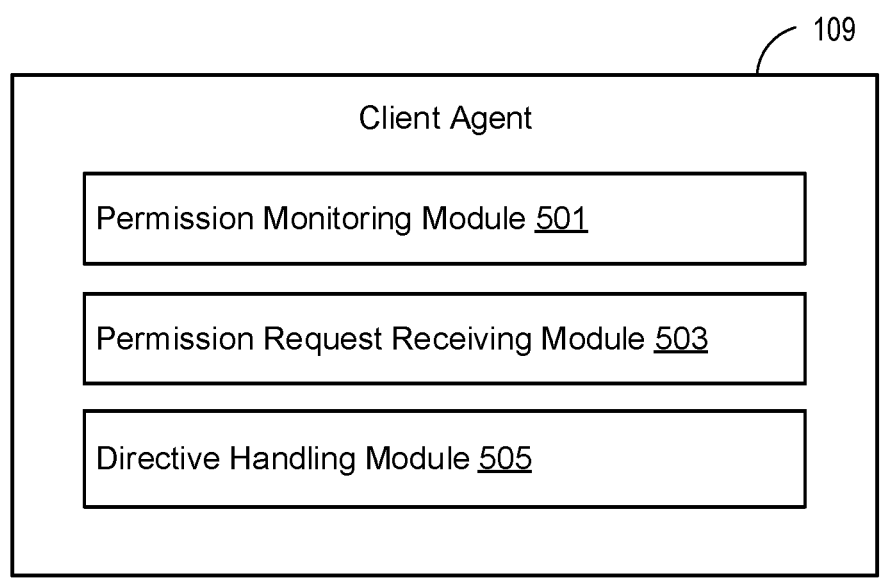
FIG. 5 is a block diagram of specific modules of a client agent that works in conjunction with a server-side permission request manager, according to some implementations.

FIGS. 1-3 illustrate a permission request manager 101 running in the system memory 217 of a server 105, and client agents running in the system memory of clients 103A-N. As described above, the functionalities of the permission request manager 101 and of the client agents 109 can reside on a server 105, a client 103, or be distributed among multiple computer systems 210, including within a cloud-based computing environment in which the functionalities of the permission request manager 101 are provided as a service over a network 107. It is to be understood that although the permission request manager 101 and the client agents are illustrated in FIGS. 3 and 4 as discrete entities, the illustrated permission request manager 101 and client agents represent collections of functionalities, which can be instantiated as a single or multiple modules on one or more computing devices 210 as desired. FIGS. 4 and 5 illustrate specific implementations in which the permission request manager 101 and client agents are instantiated in the form of specific, multiple modules. In other implementations, the functionalities of the permission request manager 101 and/or client agents 109 are distributed and/or instantiated in other ways. It is to be understood that in some implementations, the permission request manager 101 and client agents 109 may be instantiated as part of or otherwise in conjunction with a server and/or client-side computer security system (not separately illustrated) that provides various computer security services.

It is to be understood that the modules of the permission request manager 101 and the client agent 109 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the permission request manager 101 and client agent 109 can be stored on computer-readable storage media. Any form of tangible computer readable storage medium can be used in this context, such as magnetic or optical storage media. As used herein, the term "computer-readable storage medium" does not mean an electrical signal separate from an underlying physical medium.

FIG. 3 is a block diagram of the operation of the permission request manager 101. In the implementation illustrated in FIG. 3, the permission request manager 101 is located in server 105, and communicates with client agents 109 located on clients 103A-N. Although FIG. 3 depicts only three clients 103 for clarity of illustration, typically many more clients 103 would be deployed in practice (e.g., tens of thousands or more). These clients are endpoint computing devices. As described in more detail below, the client agents 109 running on these endpoints track requests for permissions made by applications running thereon, as well as whether the permissions were granted or denied (e.g., by a user of the client 103). The client agents 109 transmit this empirical data indicating the granting and denying of permissions requested by applications executing on the clients 103 to the permission request manager 101. The permission request manager 101 thus receives and collects such empirical data from a large base of clients 103. The permission request manager 101 aggregates the empirical data collected from the multiple clients 103, for example in a permissions database 303 as illustrated (or in other suitable storage mechanisms in other implementations).

In order to collect the empirical data that is transmitted to the permission request manager 101, each client agent may include or be communicatively coupled to a permissions collection tool 301 that enables the client agent 109 to monitor requests for permissions made by applications running on the client 103, as well as the granting or denial of the requested permissions. For instance, in one implementation, the client agent 109 may utilize accessibility services 301A (under, e.g., Android) in order to register for and monitor screen events. By monitoring screen events, the client agent 109 can monitor requests by applications for permissions (e.g., prompts to the user to grant permissions), as well as the user responses to these requests (i.e., the granting or denial of specific permissions).

In other implementations (for example where the client agent 109 does not have permission or is otherwise unable to utilize accessibility services), the client agent 109 may include an application virtualization tool 301B, which allows an application to be executed inside another application (sometimes called a host application). Examples of such host applications that can be used as an application virtualization tool 301B include Parallel Space®, Multiple Accounts®, Dual Space®, Sandbox Apps®, etc. By running an application in an application virtualization tool 301B, the client agent 109 can monitor any activities for that application, including requests for permissions made by the application, and the user responses to these permission requests.

Other approach(es) or tool(s) 301N for monitoring requests for permissions and the granting or denial thereof can be used in other implementations.

Whatever form of permissions collection tool 301 is used, the conditions and contexts under which specific permissions requests are made and the corresponding user responses can also be tracked at any level of granularity. In other words, the permissions collection tool may track exactly where in the user flow permissions are requested, granted and/or denied. For instance, a user may grant a "read phone state" permission for one particular feature of an application but reject the same exact permission for another feature of the application. By collecting the context information concerning a permission request and the response to the request, a better understanding of the function of the permission for the application may be obtained.

As noted above, the monitored permission requests and user responses as well as context information where applicable for different applications are transmitted to the permission request manager 101. The permission request manager 101 amalgamates this empirical data concerning permission requests and user responses, for example storing the empirical data collected from the plurality of clients 103 in the permissions database 303.

Periodically, the permission request manager 101 analyzes the aggregated empirical data collected from the plurality of clients 103. How often to perform this analysis is a variable design parameter. Generally, once a threshold amount of empirical data from a has been aggregated (e.g., a requisite number of permission requests and responses to create a set of empirical data sufficient to allow a meaningful analysis), the permission request manager 101 performs an analysis of the aggregated data as described in detail below. What is considered a sufficient data set is a variable design parameter that can be adjusted over time in different implementations as desired.

During the analysis, the permission request manager 101 determines whether a specific permission pertains to core functionality and/or key feature(s) of an application. The permission request manager 101 may apply different analytical tools in analyzing the aggregated empirical data. In one implementation, the permission request manager 101 may go through the empirical data and crowdsource the decisions (and optionally the context information including under what circumstances these decisions have been made), to determine which specific permission requests (optionally under what circumstances) for which specific applications have been granted or denied by users in the past. For instance, the permission request manager 101 may determine an approval/denial rate for each specific permission request for each specific application. Based on the approval/denial rates, the permission request manager 101 may determine that a permission pertains to core functionality and/or key feature(s) of an application if above a threshold percentage of users granted the permission to the application in the aggregated empirical data set being analyzed. Otherwise, a permission may be determined to not pertain to core functionality and/or key feature(s) of an application. The determining process can be a straight up yes/no for permission per application, or can be a more detailed level of granularity, taking into account the context (e.g., point in the data flow) when the permission is being/was requested and granted or denied. The specific threshold to use is a variable design parameter that can be configured in advance and adjusted throughout the implementations. The determinations may then be used to generate a directive to provide guidance on whether to grant or deny permission requests that are subsequently made by given applications, as described below.

Accordingly, when a subsequent request for a specific permission is received later on a client device 103, the request information may be transmitted by the client agent 109 to the permission request manager 101, which then determines whether the permission pertains to core functionality and/or key feature(s) of an application based on the result of the analysis of the empirical data.

A directive is then generated by the permission request manager 101 to direct proper action(s) to be taken by the client agent 109 and/or user 307 in response to the received permission request.

More details concerning the generation of a directive by the permission request manager 101 and the handling of the generated directive on a client system 103 are provided below in conjunction with the descriptions of FIGS. 4-7.

FIG. 4 depicts specific modules of a server-side permission request manager, according to some implementations. As shown in the figure, the server-side permission request manager 101 comprises an empirical data collecting module 401, a data aggregating module 403, a data analyzing module 405, and a directive generating module 407.

The empirical data collecting module 401 may collect users' responses to permission requests for applications running on a large number of endpoint client devices 103. The empirical data collecting module 401 may work in cooperation with client agents 109 running on these client devices 103, for example, through permissions collection tools as discussed in conjunction with FIG. 3.

For a specific permission request of a specific application, a large number of user responses may be collected over time from different ones of the plurality of client devices 103. This collected empirical data indicating the granting or denial of specific permissions requested by applications on the endpoint client devices may be transmitted by the client agents 109 to empirical data collecting module 401 of the permission request manager 101. The data aggregating module 403 aggregates this collected empirical data.

The data analyzing module 405 analyzes the aggregated empirical data to determine whether specific permissions pertain to core functionalities and/or key features of given applications. Different techniques (e.g., different forms of statistical analysis) may be used by the data analyzing module 405 to analyze the aggregated empirical data. For instance, by using a statistics tool, the approval or rejection rate can be determined for a specific permission request for an application. Collected additional context information is also analyzed, such as under what specific circumstances permission requests for applications were granted or denied. Based on the approval/rejection rates (e.g., whether the percentage or rate of approvals exceeds a given threshold), the data analyzing module 405 may determine whether given permissions pertain to core functionalities and/or key features of given applications.

The directive generating module 407 may generate a directive in response to the analysis of the aggregated empirical data. The generated directive may provide advice as to whether to grant or deny a permission request made by an application. For instance, based on the data analysis, the directive generating module 407 may generate a directive to advise a client 103 to grant a permission request if the requested permission is determined to pertain to core functionality and/or key feature(s) of the application, or to deny the permission request if the requested permission is determined to not pertain to core functionality and/or key feature(s) of the application. Similarly, the directive generating module 407 may also generate a directive to advise a user 307 to grant or deny a permission request based on whether the requested permission pertains to core functionality and/or key feature(s) of the application. More details about the handling of a directive on a client device 103 are provided in conjunction with the descriptions in FIGS. 5-7.

FIG. 5 illustrates specific modules of a client agent 109 that works in conjunction with a server-side permission request manager 101, according to some implementations. As illustrated in the figure, a client agent 109 may include a permission request monitoring module 501, a permission request receiving module 503, and a directive handling module 503.

The permission request monitoring module 501 may monitor permission requests made by applications on the client 103, and user responses to the permission requests. The permission request monitoring module 510 may operate in conjunction with different application monitoring tools or services in monitoring the permission request-related activities on a client device 103. Examples of these application behavior-monitoring tools and services include accessibility service, application virtualization, etc., as previously described in FIG. 3. The monitored permission-related activities can be transmitted to the permission request manager 101 for data aggregation and analysis, as described above.

Using the same or similar functionality, the permission request receiving module 503 may receive a permission request for a specific permission from a specific application running on the client 103. In some implementations, the permission request from an application may be a request prompted during the installation of the application, or a request prompted at runtime after the installation of the application. In some implementations, the permission request receiving module 503 is configured to receive the requests during the application installation as well as at runtime. In some implementations, the permission request receiving module 503 is configured specifically to receive requests prompted at runtime. Accordingly, the permission request collection module 503 may also collect information concerning the exact context under which a specific permission request is made. The received permission request and/or the exact context under which the request was made may be transmitted to the permission request manager 101 for analysis and directive generation, as previously described in FIG. 4.

The directive handling module 505 handles a directive received from the permission request manager 101. As previously described, a directive generated by the permission request manager 101 may include an instruction/advice on granting or denying a request to be displayed to the user. Accordingly, in one implementation, the directive handling module 505 may generate a display of the advice/instruction on a user interface of the client device 103, so that a user of the client device 103 can follow the advice or instruction displayed on the device.

Different technologies may be implemented in displaying the advice/instruction on a client device. In one implementation, a screen overlay technology may be applied. For instance, the Android® operating system includes screen overlay functionality, which allows an overlay of the advice/instruction over another user interface(s) (e.g., a prompted permission request).

In some implementations, a generated directive may include only a guidance as to granting or denying a permission request. A user 307 may follow the displayed guidance to grant or reject a permission request, for example by selecting an option (e.g., a graphical user interface button or other elements) that is part of the prompted permission request.

In some implementations, the directive handling module 505 may automatically select a grant or deny option by integrating the advice/instruction into a response to the promoted request, which does not require a user to select an option of grant or deny of the prompted request. Accordingly, a user 307 only needs to confirm the automatically selected option. By handling a directive in this way, an accidental human error in selecting an advised option may be avoided.

In some implementations, the directive handling module 505 may automatically reject a permission request even without requiring a user 307 to confirm the rejection. For instance, if a permission request is adjudicated to be malicious based on the data analysis, the permission request may be automatically rejected by the directive handling module 505 based on the advice/instruction included in the directive. In some implementations, a note may be displayed for an automatic rejection to inform a user 307 the automatic rejection of the permission request, and, e.g., the reason for the automatic rejection. The directive handling module 505 may automatically reject a permission request through other services provided with the client device 103, for instance, through the accessibility service as previously described in FIG. 3.

In some implementations, the directive handling module 505 may further generate a warning to inform a user a likely risk if the directive advises a denial to be taken for a permission request. For instance, if the data analysis indicates that the approval rate for the permission request is extremely low (e.g., less than a threshold), a generated directive may advise a generation of a warning for the permission request. Accordingly, the directive handling module 505 may generate a warning to notify a user of the potential risk for the permission request.

In some implementations, a directive may further suggest (or automatically execute) an anti-malware scanning of an application if an associated permission request has an extreme-low approval rate (e.g., less than a threshold), or the application generally has a number of permission requests that have low approval rates based on the data aggregation. In this scenario, the directive handling module 505 may communicate with (or be instantiated as part of) an endpoint security application to initiate a scanning of the application. Based on the result of scanning, the directive handling module 505 may further generate a warning to notify the risk of the application if the scanning result indicates the application is suspicious (or automatically take a security action such as deleting or quarantining the application if the scanning indicates the application is known malicious).

Figure 6:
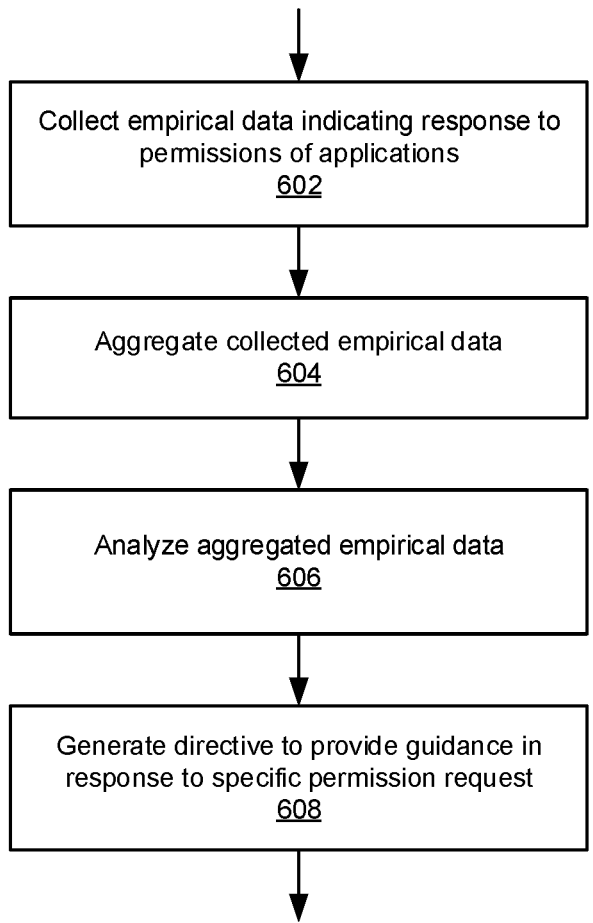
FIG. 6 is a flowchart of an exemplary method for implementing empirical data-based approval or denial of a permission request on a server, according to some implementations.

FIG. 6 is a flowchart of an exemplary method for implementing empirical data-based approval or denial of a permission request on a server.

At step 602, the permission request manager 101 collects empirical data concerning the prompted permission requests for applications and user responses to these permission requests from a plurality of user devices 103. The empirical data may be collected over time through different technologies or tools operating on client devices 103, which is then forwarded to the permission request manager 101 for data aggregation and analysis. At step 604, the permission request manager 101 aggregates the collected empirical data, for example in the permissions database 303.

Once a requisite amount of empirical data has been aggregated, at step 606 the permission request manager 101 analyzes the aggregated empirical data. The permission request manager 101 may use different analysis tools to analyze the collected empirical data. Based on the data analysis, it may be determined whether the requested permission pertains to core functionality and/or key feature(s) of the application. For instance, based on the empirical data, it is found that the majority of users (e.g., over 95% of users) have granted the permission request, and thus the requested function in the permission request may be determined to pertain to core functionality and/or key feature(s) of the application. In one example, if an application is a social network communication tool and is requesting a permission to access a user's camera, the majority of the users may approve the permission request based on the analysis of the empirical data. The permission is determined to pertain to core functionality and/or key feature(s) of the application.

Under certain circumstances, based on the empirical data, it may be found that an application has a statistically significant disparity in the rejection rate for a specific permission. In this scenario, the permission for the specific application may be then considered to be: 1) not required for the application's core functionality (e.g., for a social network communication application, a request for phone state permission purely for tracking purpose, which is not valuable to a user 307 and can be omitted without loss of the functionality), 2) required for a feature of an application but the feature is not a key feature of the application (e.g., a permission request for a contact list for contacting purpose, which is not a key feature of a navigation application), 3) dangerous permission, as the request tries to deceive a user to provide permission so as to conduct dishonest activities (e.g., collecting sensitive information including bank credentials, credit card numbers, etc.).

After the data analysis and the determination whether a permission pertains to core functionality and/or key feature(s) of an application, a directive may be generated for a subsequently received same permission request.

At step 606, the permission request manager 101 generates a directive for a subsequently received permission request. The directive may be generated based on the data aggregation of the empirical data, and may include advice as to accept or reject the received permission request. For instance, if the result of data analysis indicates that the requested permission pertains to core functionality and/or key feature(s) of the application, a generated directive may include advice suggesting the permission request to be granted. However, if the result of data analysis indicates that the requested permission does not pertain to core functionality and/or key feature(s) of the application, the generated directive may include advice to reject the permission request.

In some implementations, the permission request manager 101 may generate a directive taking into consideration of the context information of the prompted request. In one example, if the context information indicates that a permission request is prompted when a user is accessing one specific feature of an application. However, the permission request is not required for that specific feature, but pertains to another feature of the application, the generated directive may still advise the permission request to be rejected even the requested permission pertains to the other feature(s) of the application.

Once a directive is generated for a specific permission request, the generated directive may be then delivered to the client device to instruct whether to grant or deny the permission request prompted on the client device 103.

Figure 7:
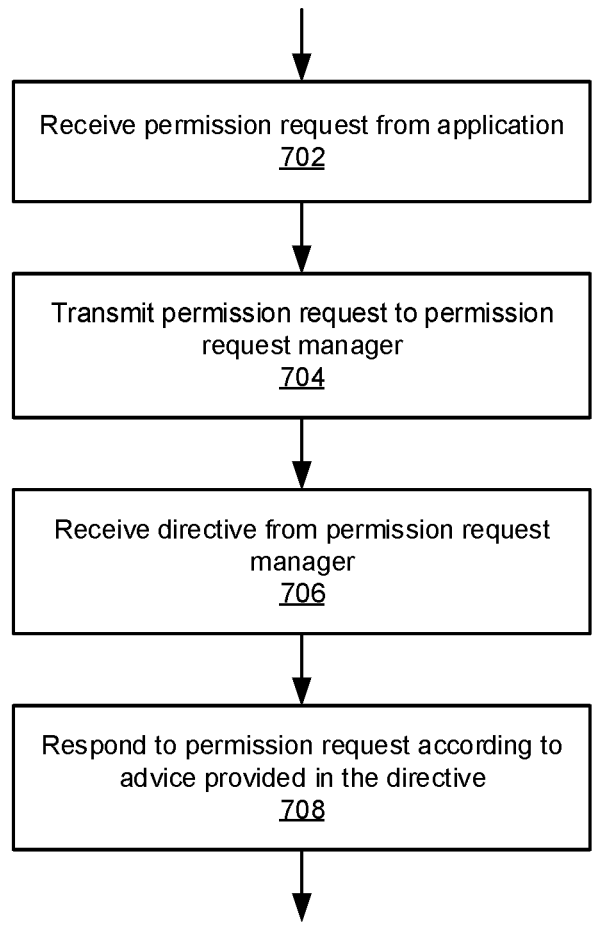
FIG. 7 is a flowchart of an exemplary method for implementing empirical data-based approval or denial of a permission request on a client system, according to some implementations.

FIG. 7 is a flowchart of an exemplary method for implementing empirical data-based approval or deny of a permission request on a client device.

At step 702, the client agent 109 receives a permission request from an application running on a client device 103. The permission request may be a request for permissions during the installation of the application, or may be a permission request that is prompted at runtime, i.e., when a user is running an application. In some implementations, context information or user flow may also be collected and forwarded to the permission request manager 101.

At step 704, the collected permission request and/or the context information concerning the permission request is transmitted to the permission request manager 101. The permission request manager 101 may then generate a directive based on the previous data aggregation and analysis of the empirical data for the same permission request. The generated directive may be then returned back to the client agent 109 of the client system 103.

At step 706, the client agent 109 receives the directive generated by the permission request manager 101. The received directive may be displayed to the user of the client device by overlaying a dialog containing the advice/instruction in the directive. The advice/instruction may provide guidance to accept or reject the permission request by the user. In some implementations, the advice and instruction in the directive may be directly intergraded into the response option of the prompted permission request, so that a user 307 does not need to select to grant or deny the permission request, but just needs to confirm the option automatically selected by the client agent 109 (or the directive handling module 505).

At step 708, a user 307 or client agent 109 responds to the permission request based on the directive received from the permission request manager 101 for the specific permission. For instance, a user 307 may select to accept or reject the permission request based on the advice/instruction displayed on the client device 103, or confirm the option automatically selected by the client agent 109 based on the directive received from the permission request manager 101. In some implementations, a permission request may be automatically selected without even requiring a user to confirm the selection. In any of the above implementations, it can be ensured that users are making informed decisions or the clients are taking proper actions, which helps address a growing problem where applications are requesting unnecessary and potentially dangerous permissions.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific implementations. However, the illustrative discussions above are not intended to be exhaustive or limited to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

What is claimed is:

1. A computer-implemented method comprising:
   collecting empirical data from a plurality of endpoint computing devices, the empirical data indicating granting or denying of permissions requested by applications on the endpoint computing devices, wherein collecting empirical data further comprises monitoring user interactions with permission requests through virtualization of at least one application, and wherein collecting empirical data further comprises collecting empirical data gleaned on endpoint computing devices by monitoring user interactions with permission requests through an accessibility service, wherein monitoring the user interactions with the permission requests through the accessibility service further comprises:
   registering for screen events using the accessibility service;
   detecting screen events comprising applications requesting permissions; and
   monitoring responses to the applications requesting permissions;
   aggregating the empirical data collected from the plurality of endpoint computing devices; and
   taking an action in response to a specific instance of a specific application on a specific endpoint computing device requesting a specific permission, in response to analysis of the aggregated empirical data.

2. The method of claim 1, wherein collecting the empirical data from the plurality of endpoint computing devices further comprises:
   collecting context information under which permission requests are granted or denied.

3. The method of claim 1, wherein monitoring the user interactions with the permission requests through the virtualization of at least one application further comprises:
   running an application in a sandbox provided by a hosting application;
   monitoring permission requests made by the application running in the sandbox; and
   monitoring responses to the permission requests received by the application running in the sandbox.

4. The method of claim 1, further comprising:
   analyzing the aggregated empirical data; and
   identifying a subset of permissions that pertain to core functionality of given applications.

5. The method of claim 1, further comprising:
   analyzing the aggregated empirical data; and
   identifying a subset of permissions that pertain to core features of given applications.

6. The method of claim 1, wherein taking an action in response to a specific instance of a specific application on a specific endpoint computing device requesting at least one specific permission further comprises:
   transmitting a directive to the specific endpoint computing device, the directive indicating to automatically output advice to a user of the specific endpoint computing device concerning whether to grant or deny the specific permission.

7. The method of claim 1, wherein taking an action in response to a specific instance of a specific application on a specific endpoint computing device requesting at least one specific permission further comprises:
   transmitting a directive to the specific endpoint computing device, the directive indicating to automatically deny the specific permission in response to the specific permission having been identified as not pertaining to core functionality or core features of the specific application having been identified as not pertaining to core functionality or core features of the specific application.

8. The method of claim 1, wherein the specific application is an Android app.

9. The method of claim 1, wherein the specific endpoint computing device is a mobile computing device running Android.

10. A computer-implemented method comprising:
    receiving a permission request for a specific permission from a specific application running on a specific endpoint computing device;

collecting context information pertaining to the permission request;

transmitting the permission request and the context information to a backend server;

receiving, from the backend server, a directive concerning whether to grant or deny the permission request of the specific permission, the directive being determined based on empirical data collected from a plurality of endpoint computing devices, wherein collecting empirical data further comprises monitoring user interactions with permission requests through virtualization of at least one application, and wherein collecting empirical data further comprises collecting empirical data gleaned on endpoint computing devices by monitoring user interactions with permission requests through an accessibility service, wherein monitoring the user interactions with the permission requests through the accessibility service further comprises:

registering for screen events using the accessibility service;

detecting screen events comprising applications requesting permissions; and monitoring responses to the applications requesting permissions; and taking an action in response to receiving the directive concerning whether to grant or deny the permission request of the specific permission.

11. The computer-implemented method of claim 10, wherein taking an action further comprises:

displaying to a user an indication concerning whether to grant or deny the specific permission.

12. The computer-implemented method of claim 11, further comprising:

receiving input from the user in response to a displayed directive, and granting or denying the specific permission of the specific application in response to the received input.

13. The computer-implemented method of claim 10, wherein taking an action further comprises:

automatically granting the permission request based on the received directive.

14. The computer-implemented method of claim 10, wherein taking an action further comprises:

automatically denying the permission request based on the received directive.

15. The computer-implemented method of claim 10, wherein taking an action further comprises:

scanning the specific application using a security application; and outputting a warning to a user in response to the specific application exceeding a specific threshold of suspicious as indicated by the scanning.

16. The computer-implemented method of claim 10, wherein taking an action further comprises:

outputting a warning to a user in response to the directive received from the backend server.

17. At least one non-transitory computer-readable storage medium for determining to grant or deny a permission request from an application running on a computing device, the at least one non-transitory computer-readable storage medium storing computer executable instructions that, when loaded into computer memory and executed by at least one processor of a computing device, cause the computing device to perform the following steps:

collecting empirical data from a plurality of endpoint computing devices, the empirical data indicating granting or denying of permissions requested by applications on the endpoint computing devices, wherein collecting empirical data further comprises monitoring user interactions with permission requests through virtualization of at least one application, and wherein collecting empirical data further comprises collecting empirical data gleaned on endpoint computing devices by monitoring user interactions with permission requests through an accessibility service, wherein monitoring the user interactions with the permission requests through the accessibility service further comprises:

registering for screen events using the accessibility service;

detecting screen events comprising applications requesting permissions; and monitoring responses to the applications requesting permissions;

aggregating the empirical data collected from the plurality of endpoint computing devices; and taking an action in response to a specific instance of a specific application on a specific endpoint computing device requesting a specific permission, in response to analysis of the aggregated empirical data.

18. The at least one non-transitory computer-readable storage medium of claim 17, wherein the steps further comprise:

analyzing the aggregated empirical data; and identifying a subset of permissions that pertain to core functionality of given applications.

19. The at least one non-transitory computer-readable storage medium of claim 17, wherein the specific application is an Android app.

20. The at least one non-transitory computer-readable storage medium of claim 17, wherein the specific endpoint computing device is a mobile computing device running Android.

* * * * *